(12) United States Patent
Hall et al.

(10) Patent No.: US 7,464,772 B2
(45) Date of Patent: Dec. 16, 2008

(54) DOWNHOLE PRESSURE PULSE ACTIVATED BY JACK ELEMENT

(76) Inventors: David R. Hall, 2185 S. Larsen Pkwy., Provo, UT (US) 84606; Carla Hendengren, 2185 S. Larsen Pkwy., Provo, UT (US) 84606

( * ) Notice: Subject to any disclaimer, the term of this patent is extended or adjusted under 35 U.S.C. 154(b) by 42 days.

(21) Appl. No.: 11/766,707

(22) Filed: Jun. 21, 2007

(65) Prior Publication Data

US 2007/0242565 A1 Oct. 18, 2007

Related U.S. Application Data

(63) Continuation-in-part of application No. 11/761,095, filed on Jun. 11, 2007, which is a continuation-in-part of application No. 11/750,700, filed on May 18, 2007, which is a continuation-in-part of application No. 11/737,034, filed on Apr. 18, 2007, which is a continuation-in-part of application No. 11/686,638, filed on Mar. 15, 2007, now Pat. No. 7,424,922, which is a continuation-in-part of application No. 11/680,997, filed on Mar. 1, 2007, now Pat. No. 7,419,016, which is a continuation-in-part of application No. 11/673,872, filed on Feb. 12, 2007, which is a continuation-in-part of application No. 11/611,310, filed on Dec. 15, 2006, application No. 11/766,707, which is a continuation-in-part of application No. 11/278,935, filed on Apr. 6, 2006, now Pat. No. 7,426,968, which is a continuation-in-part of application No. 11/277,394, filed on Mar. 24, 2006, now Pat. No. 7,398,837, which is a continuation-in-part of application No. 11/277,380, filed on Mar. 24, 2006, now Pat. No. 7,337,858, which is a continuation-in-part of application No. 11/306,976, filed on Jan. 18, 2006, now Pat. No. 7,360,610, which is a continuation-in-part of application No. 11/306,307, filed on Dec. 22, 2005, now Pat. No. 7,225,886, which is a continuation-in-part of application No. 11/306,022, filed on Dec. 14, 2005, now Pat. No. 7,198,119, which is a continuation-in-part of application No. 11/164,391, filed on Nov. 21, 2005, now Pat. No. 7,270,196.

(51) Int. Cl.
*E21B 10/26* (2006.01)
*E21B 10/60* (2006.01)
(52) U.S. Cl. .............................. 175/56; 175/57; 175/389
(58) Field of Classification Search .................... 175/57, 175/317, 324, 395, 56, 389
See application file for complete search history.

(56) References Cited

U.S. PATENT DOCUMENTS

| | | | | |
|---|---|---|---|---|
| 2,054,255 | A | * | 9/1936 | Howard ....................... 175/298 |
| 2,746,721 | A | * | 5/1956 | Moore ......................... 175/317 |
| 4,637,479 | A | * | 1/1987 | Leising ........................ 175/26 |
| 4,817,739 | A | * | 4/1989 | Jeter ............................ 175/38 |

* cited by examiner

*Primary Examiner*—Hoang Dang
(74) *Attorney, Agent, or Firm*—Tyson J. Wilde

(57) ABSTRACT

In one aspect of the present invention, a method has steps for forming a wellbore with a tool string bit having a body intermediate a shank and a working face. The bit body has a fluid passageway and at least a portion of a jack element is disposed within the body. The jack element also has an end forming at least a portion of a relief mechanism in the fluid passageway and a distal end substantially protruding from the working face. The bit connected to a tool string is deployed into a wellbore. Fluid is passed through the fluid passageway. A bottom of the wellbore is destructed by pulsing the fluid traveling through the passageway by opening and closing the relief mechanism.

20 Claims, 11 Drawing Sheets

```
                    1200
```

| Providing a tool string bit with a body comprising a fluid passageway, at least a portion of a jack element being disposed within the body and comprising an end forming at least a portion of a relief mechanism in the fluid passageway |
|---|
| 1201 |

| Deploying the bit when connected to a tool string into a wellbore |
|---|
| 1202 |

| Passing fluid through the fluid passageway |
|---|
| 1203 |

| Destructing a bottom of the wellbore by pulsing the fluid traveling through the passageway by opening and closing the relief mechanism |
|---|
| 1204 |

Fig. 12

DOWNHOLE PRESSURE PULSE ACTIVATED BY JACK ELEMENT

CROSS REFERENCE TO RELATED APPLICATIONS

This patent Application is a continuation-in-part of U.S. patent application Ser. No. 11/761,095 filed on Jun. 11, 2007 and entitled Drill Bit Transducer Device. U.S. patent application Ser. No. 11/761,095 is a continuation-in-part of U.S. patent application Ser. No. 11/750,700 filed on May 18, 2007 and entitled Jack Element with a Stop-off. U.S. patent application Ser. No. 11/750,700 a continuation-in-part of U.S. patent application Ser. No. 11/737,034 filed on Apr. 18, 2007 and entitled Rotary Valve for Steering a Drill Bit. U.S. patent application Ser. No. 11/737,034 is a continuation-in-part of U.S. patent application Ser. No. 11/686,638, now U.S. Pat. No. 7,424,922, filed on Mar. 15, 2007 and entitled Rotary Valve for a Jack Hammer. U.S. patent application Ser. No. 11/686,638 is a continuation-in-part of U.S. patent application Ser. No. 11/680,997, now U.S. Pat. No. 7,419,016, filed on Mar. 1, 2007 and entitled Bi-center Drill Bit. U.S. patent application Ser. No. 11/680,997 is a continuation-in-part of U.S. patent application Ser. No. 11/673,872 filed on Feb. 12, 2007 and entitled Jack Element in Communication with an Electric Motor and/or generator. U.S. patent application Ser. No. 11/673,872 is a continuation-in-part of U.S. patent application Ser. No. 11/611,310 filed on Dec. 15, 2006 and which is entitled System for Steering a Drill String. This Patent Application is also a continuation-in-part of U.S. patent application Ser. No. 11/278,935, now U.S. Pat. No. 7,426,968 filed on Apr. 6, 2006 and which is entitled Drill Bit Assembly with a Probe. U.S. patent application Ser. No. 11/278,935 is a continuation-in-part of U.S. patent application Ser. No. 11/277,394, now U.S. Pat. No. 7,398,837, which filed on Mar. 24, 2006 and entitled Drill Bit Assembly with a Logging Device. U.S. patent application Ser. No. 11/277,394 is a continuation-in-part of U.S. patent application Ser. No. 11/277,380, now U.S. Pat. No. 7,337,858, also filed on Mar. 24, 2006 and entitled A Drill Bit Assembly Adapted to Provide Power Downhole. U.S. patent application Ser. No. 11/277,380 is a continuation-in-part of U.S. patent application Ser. No. 11/306,976, now U.S. Pat. No. 7,360,610, which was filed on Jan. 18, 2006 and entitled "Drill Bit Assembly for Directional Drilling." U.S. patent application Ser. No. 11/306,976 is a continuation-in-part of Ser. No 11/306,307, now U.S. Pat. No. 7,225,886 filed on Dec. 22, 2005, entitled Drill Bit Assembly with an Indenting Member. U.S. patent application Ser. No. 11/306,307 is a continuation-in-part of U.S. patent application Ser. No. 11/306,022, now U.S. Pat. No. 7,198,119, filed on Dec. 14, 2005, entitled Hydraulic Drill Bit Assembly. U.S. patent application Ser. No. 11/306,022 is a continuation-in-part of U.S. patent application Ser. No. 11/164,391, now U.S. Pat. No. 7,270,196, filed on Nov. 21, 2005, which is entitled Drill Bit Assembly. All of these applications are herein incorporated by reference in their entirety.

BACKGROUND OF THE INVENTION

The present invention relates to oil and gas drilling, and more particularly to methods for forming a wellbore. In many drilling operations a drilling fluid is used to clear the material cut by the tool string bit from the wellbore and maintains a substantial hydrostatic pressure at the depth of the tool string bit that withstands the pressure produced in the surrounding formation. However, this conventional drilling is slowed by the confining pressure exerted by a column of mud in the wellbore. The pressure at the bottom of the wellbore is typically kept at a pressure greater than or equal to the pressure of the fluid pressure in the formation being drilled. The confining pressure of the mud increases the strength and plasticity of rock, reducing the efficiency of indentation and shear cutting.

Another known method for drilling a wellbore is known as Underbalanced Drilling, or UBD. During an UBD procedure, the pressure in the wellbore is maintained lower than the fluid pressure in the formation being drilled. It is believed that using UBD has several advantages over conventional drilling. One advantage is that it is easier to break up the formation being drilled and thereby drilling at an increased Rate of Penetration (ROP). However, UBD may reduce the stability of the wellbore, thereby increasing the risk of the wellbore collapsing in on itself because of the low pressure over the entire open section of the hole. Thus, it may be beneficial to create and maintain a low pressure at the bottom of the wellbore while maintaining a normal pressure higher up the wellbore.

The prior art has addressed drilling operations in an UBD environment. Such issues have been addressed in the U.S. Pat. No. 6,237,701 to Kollé et al., which is herein incorporated by reference for all that it contains. The '701 patent discloses suction pressure pulses generated within a borehole by closing a valve that interrupts the flow of a drilling fluid (e.g., drilling mud) circulating through one or more high velocity flow courses within the borehole. In one embodiment in which the suction pressure pulses are applied to improve the efficiency of a drilling bit, the valve interrupts the flow of drilling mud directed through the bit and thus through high velocity flow course(s) disposed downstream of the bit. Arresting flow of the drilling mud through the high velocity flow course(s) generates suction pressure pulses of substantial magnitude over a face of the tool string bit. The suction pressure pulses provide a sufficient differential pressure that weakens the rock through which the tool string bit is advancing and also increase the force with which the tool string bit is being advanced toward the rock at the bottom of the borehole. However, the flow of drilling mud into an inlet port of the valve is not interrupted, so that fluid motors can still be used to rotate the tool string bit. When the valve is closed, the drilling mud continues to flow into the valve and subsequently flows back into the borehole. The suction pressure pulses can also be applied to a short section of the borehole wall to produce seismic pulses, or to provide remediation of formation damage (by drawing fines from the wall of a borehole to enhance oil and gas production rates), or can be employed for descaling tubes within a borehole.

U.S. Pat. No. 5,740,127 to Van Steenwyk, et al., which is herein incorporated by reference for all that it contains, discloses a fluid pulsing apparatus operable in a drill pipe in a well in which well drilling fluid flows, wherein pressure pulses are created by restricting one or more of several hydraulically parallel paths, constant working pressure regulating valves with a long time constant relative to the transient pulses are constructed in the hydraulically parallel paths. The valves operate to produce a more consistent pulse character allowing production of pulses at low flow rates of drilling fluid that are of sufficient amplitude to be more easily detected on the Earth's surface and restriction of amplitude of pressure pulses at high flow rates of drilling fluid to limit equipment damage and loss of hydraulic energy. The valves function by varying the flowing cross sectional area of the hydraulically parallel paths.

BRIEF SUMMARY OF THE INVENTION

In one aspect of the present invention, a method has steps for forming a wellbore with a tool string bit having a body intermediate a shank and a working face. The bit body has a fluid passageway and at least a portion of a jack element is disposed within the body. The jack element also has an end forming at least a portion of a relief mechanism in the fluid passageway and a distal end substantially protruding from the working face. The bit connected to a tool string is deployed into a wellbore. Fluid is passed through the fluid passageway. A bottom of the wellbore is destructed by pulsing the fluid traveling through the passageway by opening and closing the relief mechanism. The pulsing fluid generates a suction pressure pulse in the wellbore. It is believed that a suction pressure pulse may be an efficient way of breaking up a downhole formation.

The relief mechanism may comprise a relief valve or a rotary valve. A portion of the relief mechanism may be adapted for attachment to a driving mechanism such as a motor, turbine, electric generator, or combinations thereof. The driving mechanism may be controlled by a closed loop system and may rotate opposite of the jack element.

The working face may have a plurality of cutting elements. A spring mechanism may be disposed within the fluid passageway of the tool string bit; the spring being adapted to engage the jack element. The spring may help to control the vibrations of the jack element. A nozzle may be disposed within an opening in the working face of the tool string bit. A surface of the relief mechanism may have a hardness of at least 58 HRc. The surface may comprise a material selected from the group consisting of chromium, tungsten, tantalum, niobium, titanium, molybdenum, carbide, natural diamond, polycrystalline diamond, vapor deposited diamond, cubic boron nitride, TiN, AlNi, AlTi, TiAlN, CrN/CrC/(Mo, W)S2, TiN/TiCN, AlTiN/MoS2, TiAlN, ZrN, diamond impregnated carbide, diamond impregnated matrix, silicon bonded diamond, and/or combinations thereof.

When closed, the relief mechanism may restrict all flow within the fluid passageway or may restrict only a portion of the flow within the fluid passageway. The tool string may also have a sensor adapted to receive acoustic reflections produced by either the pulse that propagates into the formation or the vibrations of the jack element. The sensor may be beneficial in determining formation characteristics.

BRIEF DESCRIPTION OF THE DRAWINGS

FIG. 12 is a diagram of an embodiment of a method for forming a wellbore.

DETAILED DESCRIPTION OF THE INVENTION AND THE PREFERRED EMBODIMENT

Figure 1:
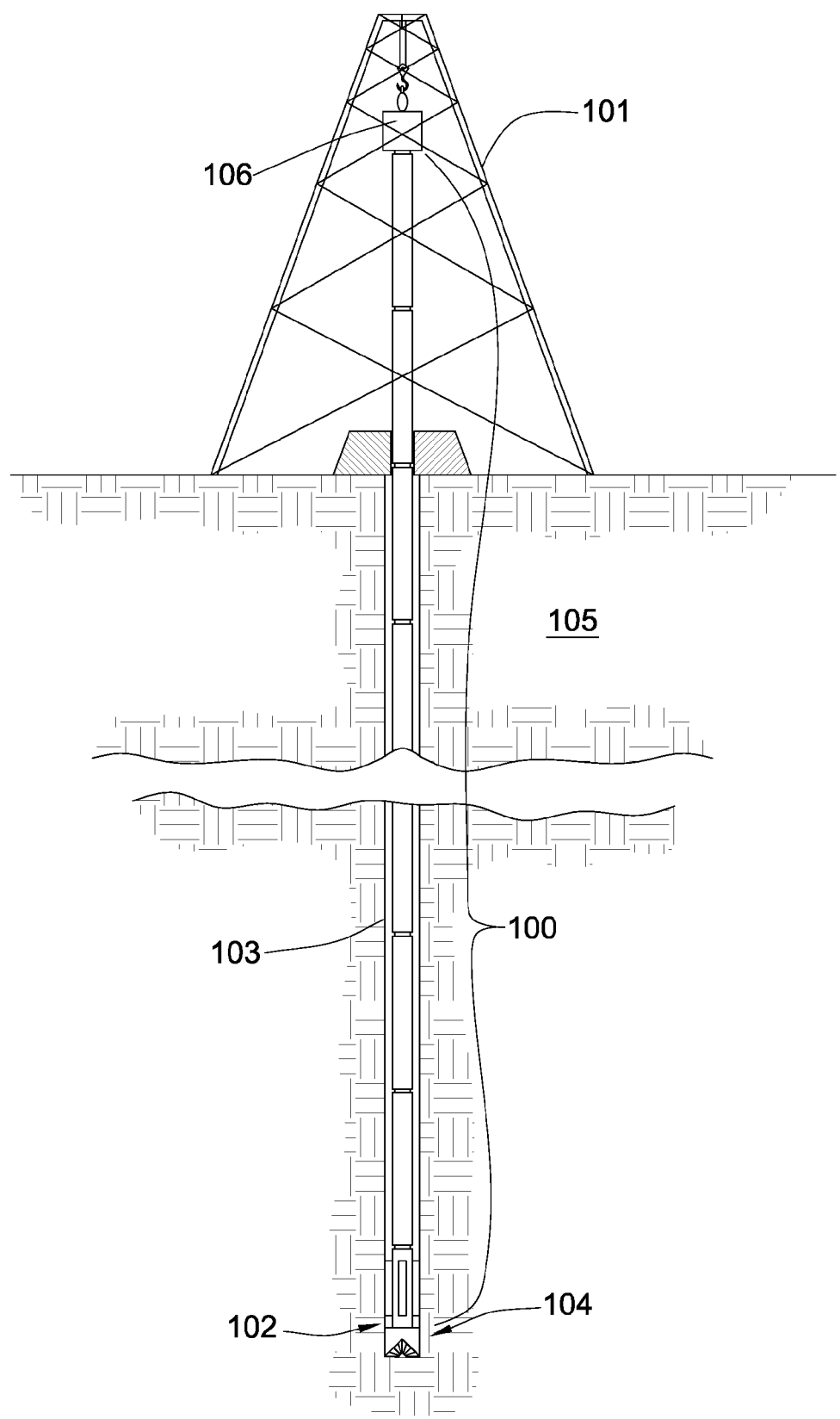
FIG. 1 is a perspective diagram of an embodiment of a tool string suspended in a wellbore.

FIG. 1 shows a cross-sectional diagram of an embodiment of a tool string 100 suspended by a derrick 101. A bottom hole assembly 102 is located at the bottom of a wellbore 103 and comprises a tool string bit 104. As the tool string bit 104 rotates downhole the tool string 100 advances farther into the earth. The tool string 100 may penetrate soft or hard subterranean formations 105. The bottom-hole assembly 102 and/or downhole components may comprise data acquisition devices which may gather data. The data may be sent to the surface via a transmission system to a data swivel 106. The data swivel 106 may send the data to the surface equipment. Further, the surface equipment may send data and/or power to downhole tools and/or the bottom-hole assembly 102. U.S. Pat. No. 6,670,880 which is herein incorporated by reference for all that it contains, discloses a telemetry system that may be compatible with the present invention; however, other forms of telemetry may also be compatible such as systems that include mud pulse systems, electromagnetic waves, radio waves, and/or short hop. In some embodiments, no telemetry system is incorporated into the drill string.

Figure 2:
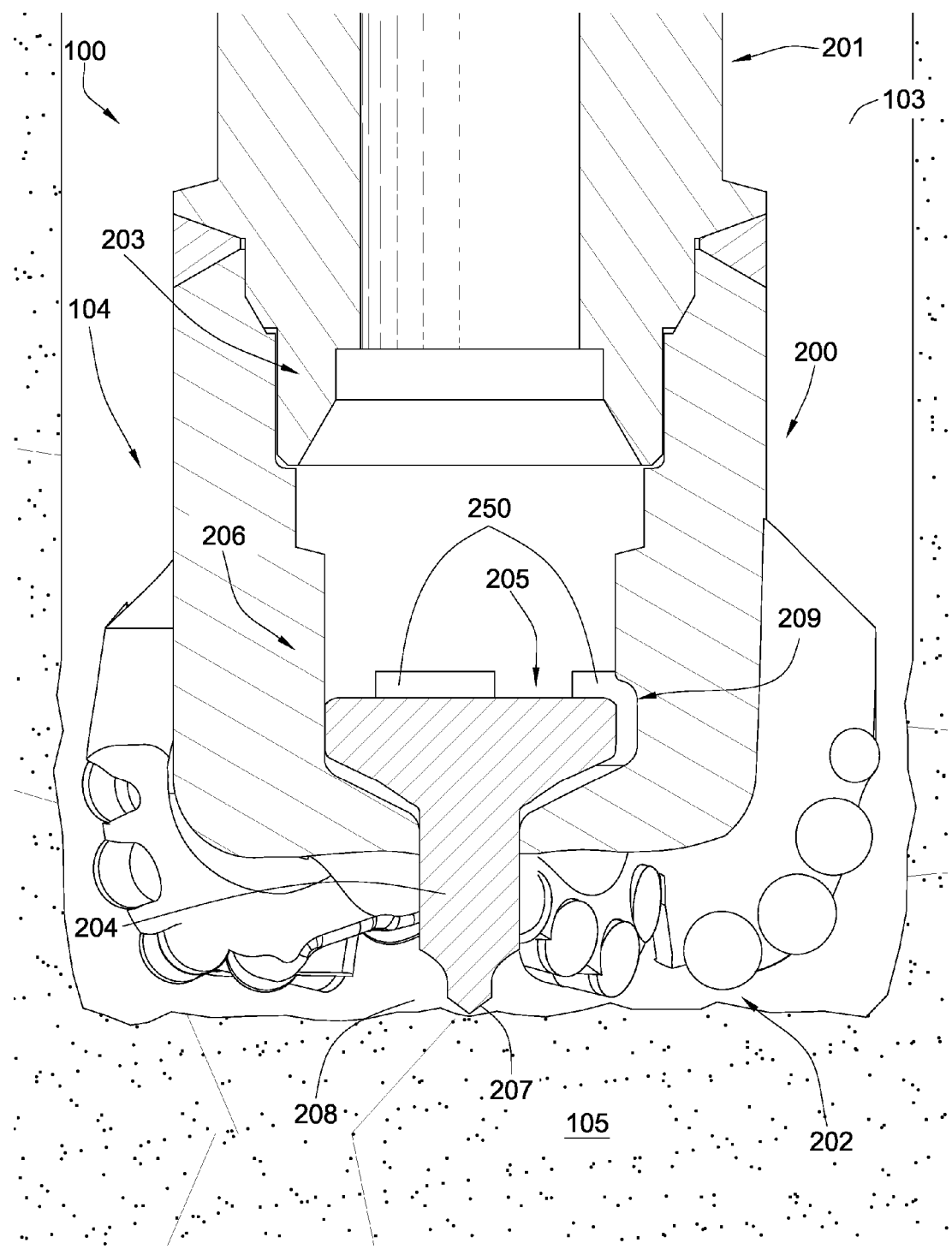
FIG. 2 is a cross-sectional diagram of an embodiment of a tool string bit.

FIG. 2 is a cross-sectional diagram of an embodiment of a tool string bit 104. The tool string bit 104 may be adapted for attachment to a downhole tool string 100. The tool string bit 104 may have a body 200 intermediate a shank 201 and a working face 202. A fluid passageway 203 may be disposed within the bit body 200. At least a portion of a jack element 204 may be disposed within the body 200 and may have a proximal end 205 forming at least a portion of a relief mechanism 206 in the fluid passageway 203 and a distal end 207 substantially protruding from the working face 202. The tool string bit 104 may be deployed into a wellbore 103 when connected to a tool string 100. The bottom 208 of the wellbore 103 may be destructed by pulsing the fluid traveling through the passageway 203 by opening and closing the relief mechanism 206. The pulsing fluid may generate a suction pressure pulse in the wellbore 103. In the preferred embodiment, the relief mechanism 206 may comprise a relief valve 209. The jack element 204 may restrict a portion of the fluid flow through the passageway 203 to at least one fluid port 250 formed within the wall of the fluid passageway 203. The restricted fluid flow may cause a fluid pressure to build up in the fluid passageway 203 of the tool string bit 104. The fluid pressure may force the jack element 204 into the formation 105, allowing the fluid to pass through the at least one fluid port 250, directing drilling fluid to at least one nozzle disposed within an opening in the working face 202, thereby relieving the fluid pressure. The formation 105 may force the jack element 204 back to its original position, reforming the restriction. While drilling in soft formations, the force exerted on the distal end 207 of the jack element 204 by the formation 105 may not overcome the force exerted on the proximal end 205 of the jack element 204. In such formations, the jack element 204 may not vibrate. However, while drilling through hard formations, the force of the formation on the distal end 207 of the jack element 204 may overcome the force exerted on the proximal end 205 of the jack element 204, thus displacing the jack element 204 back to its original position until the built up fluid pressure overcomes the force from the formation.

Intermittingly pulsing fluid through the nozzle may more efficiently break up the formation 105 being drilled. Drilling fluid contacting the formation 105 may forcibly break up the formation 105. The fluid may also increase the pressure in the bottom 208 of the wellbore 103. However, when fluid is restricted, the pressure at the bottom 208 of the wellbore 103 may decrease to a pressure below that of the fluid in the formation It is believed that this method may cause a suction effect and weaken the formation being drilled so that the tool string bit 104 may more easily break up the formation 105 during a drilling operation. The suction effect may also help to cut and remove rock from the wellbore 103.

Figure 3:
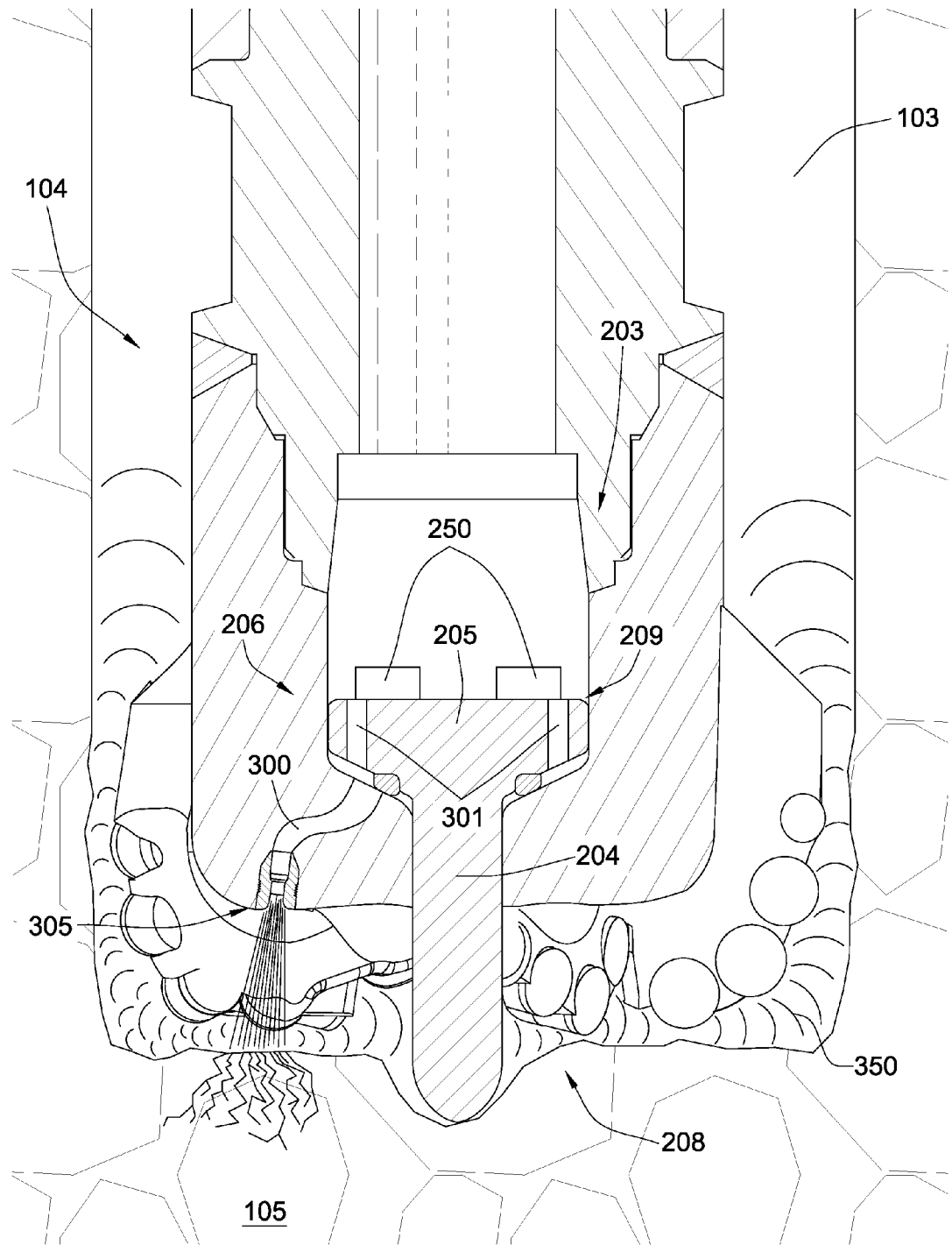
FIG. 3 is a cross-sectional diagram of another embodiment of a tool string bit.
Figure 4:
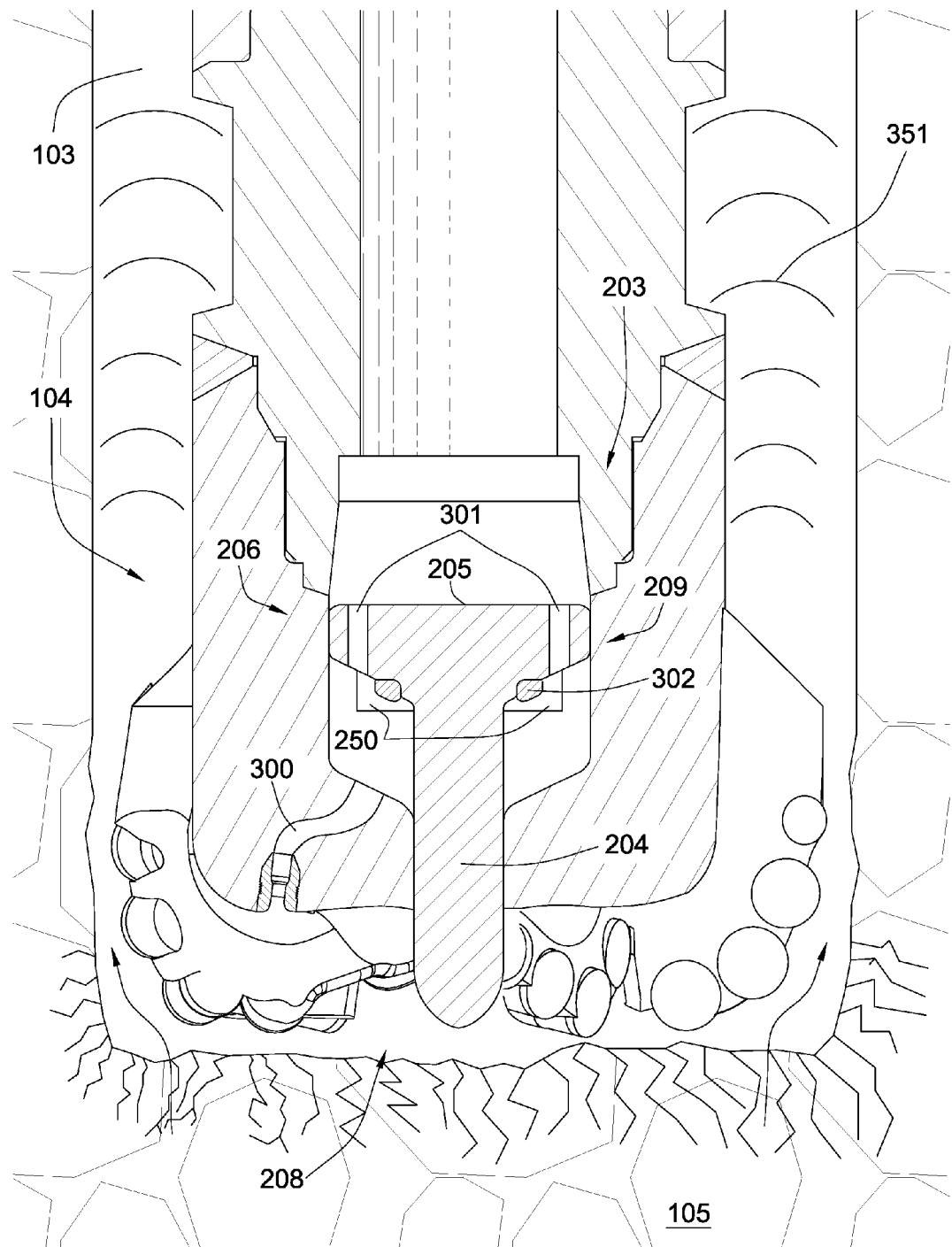
FIG. 4 is a cross-sectional diagram of another embodiment of a tool string bit.

FIGS. 3 and 4 illustrate a relief mechanism 206 disposed in the fluid passageway 203 of the tool string 100. In this embodiment, the relief mechanism 206 comprises a relief valve 209. The proximal end 205 of the jack element 204 may be part of the relief valve 209 such that its vibrations open and close the valve 209. As shown in FIG. 3, fluid flowing through the fluid passageway 203 of the tool string bit 104 may force the jack element 204 into the formation 105 such that fluid may flow through the at least one fluid port 250. The fluid port 250 may be in communication with at least one nozzle 300 disposed within an opening 305 the bit 104. By opening the valve 209, fluid may flow through the nozzle 300 and contact the formation 105. Opening the valve 209 may also increase the pressure 350 at the bottom 208 of the wellbore 103. A dense drilling mud may be used in drilling operations in which a higher pressure is desired at the bottom 208 of the wellbore 103. It is believed that the fluid flowing out of the nozzle 300 may help in breaking up the formation 105 being drilled because of the force in which it contacts the formation 105.

The formation 105 being drilled may force the jack element 204 higher into the fluid passageway 203 such that the proximal end 205 of the jack element 204 restricts fluid flow to the fluid ports 250. This is shown in FIG. 4. In this embodiment, other fluid ports 301 may be formed in the proximal end 205 of the jack element so that when the valve 209 is closed, a portion of the fluid may flow from the fluid passageway 203 to the at least one fluid port 250 disposed in the fluid passageway 203. In other embodiments, the proximal end 205 may restrict all the flow in the fluid passageway 203 while closed. When the valve 209 is closed during a drilling operation, the pressure at the bottom 208 of the wellbore 103 may be reduced. This reduction of pressure in the wellbore 103 may create a pressure differential between the wellbore and the fluid in the formation, weakening the surrounding formation 105. However, it is believed that the wellbore may become weak and possibly collapse in on itself when the pressure in the wellbore 103 is lower than the pressure of the fluid in the formation. This problem may be avoided if a higher pressure is maintained in the upper wellbore while a lower pressure is maintained at the bottom of the wellbore, stabilizing the wellbore. Drilling fluid may stabilize the surrounding formation as it is suctioned up the wellbore 103 during a drilling operation. The fluid flowing up the wellbore 103 may cause a wellbore pressure 351 to increase, thereby stabilizing the wellbore. Thus, by creating the suction pressure pulse at the bottom 208 of the wellbore 103, drilling efficiency may increase while maintaining a stable drilling environment. In some embodiments, a stop element 302 may be disposed around the proximal end 205 such that the surface of the jack element 204 may be supported as it vibrates within the fluid passageway 203.

It is believed that when the drilling fluid is restricted, the pressure within the tool string's bore will increase causing the bore to expand. This expansion may cause a momentary reduction of weight on bit as well as decrease the volume of the annulus formed between the tool string and the wellbore's wall. Once the pressure within the tool string bore is released, it is believed that the tool string will constrict and the weight on bit will increase which will cause the volume of the annulus to increase. The expansion and constriction of the tool string causing a fluctuation in the volume of the annulus is believed to contribute to the suction effect experience at the bottom of the well bore and increasing in the penetration rate.

The expansion and contraction may be amplified by providing a compliant tool string component. In some embodiments a compliant tool string component may comprise grooves adapted to provide the tool string component with compliancy and in some embodiments the tool string component may have at least one region with a thinner wall section to provide the compliancy. The expansion and contraction may generate waves in the tool string which may also aid the tool string in a forward motion. These waves may grab the wellbore wall and pull tool string along. The grabbing affect may be amplified by providing a feature or texture on the outer surface of the tool string.

Figure 5:
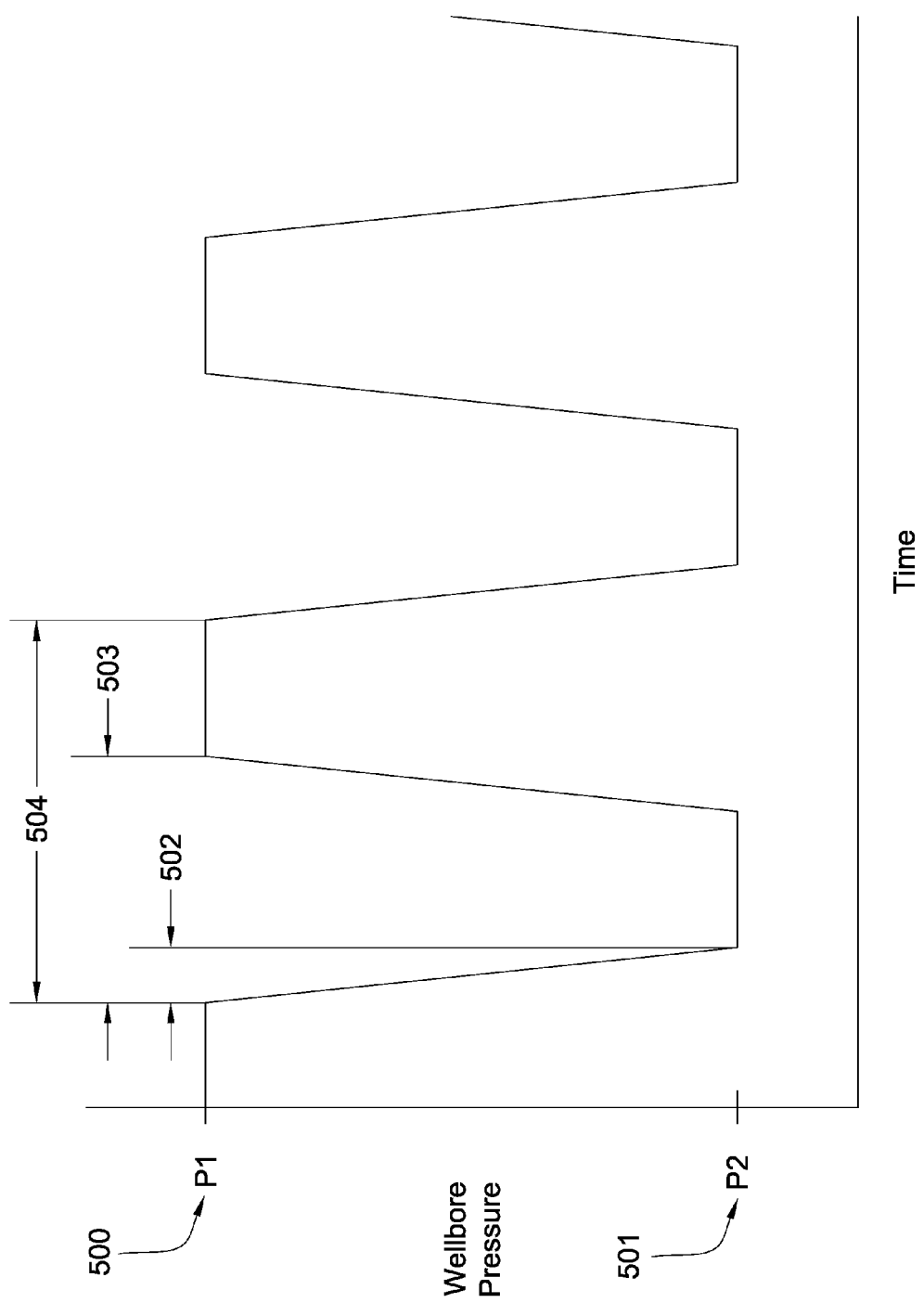
FIG. 5 is a graph representing wellbore pressures as a function time during a drilling operation.

FIG. 5 graphically represents a pressure in the wellbore in relation to time as a suction pressure pulse 504 is applied to the downhole formation during a drilling operation. As previously described, the pressure at the bottom of the wellbore may vary with time due to the suction pressure pulse 504. A first pressure 500 is the normal hydrostatic pressure of the drilling fluid in the wellbore. The first pressure 500 exists at the bottom of the wellbore when fluid flows through at least one nozzle and contacts the formation. A second pressure 501 lower than the first pressure 500 occurs downhole due to the creation of the suction effect. The suction effect may be generated by restricting the flow through the nozzle for a period of time. A time period 502 shows the time it takes for the pressure in the wellbore to drop from the first pressure 500 to the minimum pressure, or a second pressure 501. It may be desired that the time period 502 is substantially shorter than a time period 503, the duration of the suction effect. The duration of the suction effect 503 may be controlled by adjusting the speed at which the relief mechanism operates. Sensors and other control equipment may be used to analyze information concerning characteristics of the downhole formation and adjust the pulsing of the fluid by adjusting the speed of the relief mechanism opening and closing.

Figure 6:
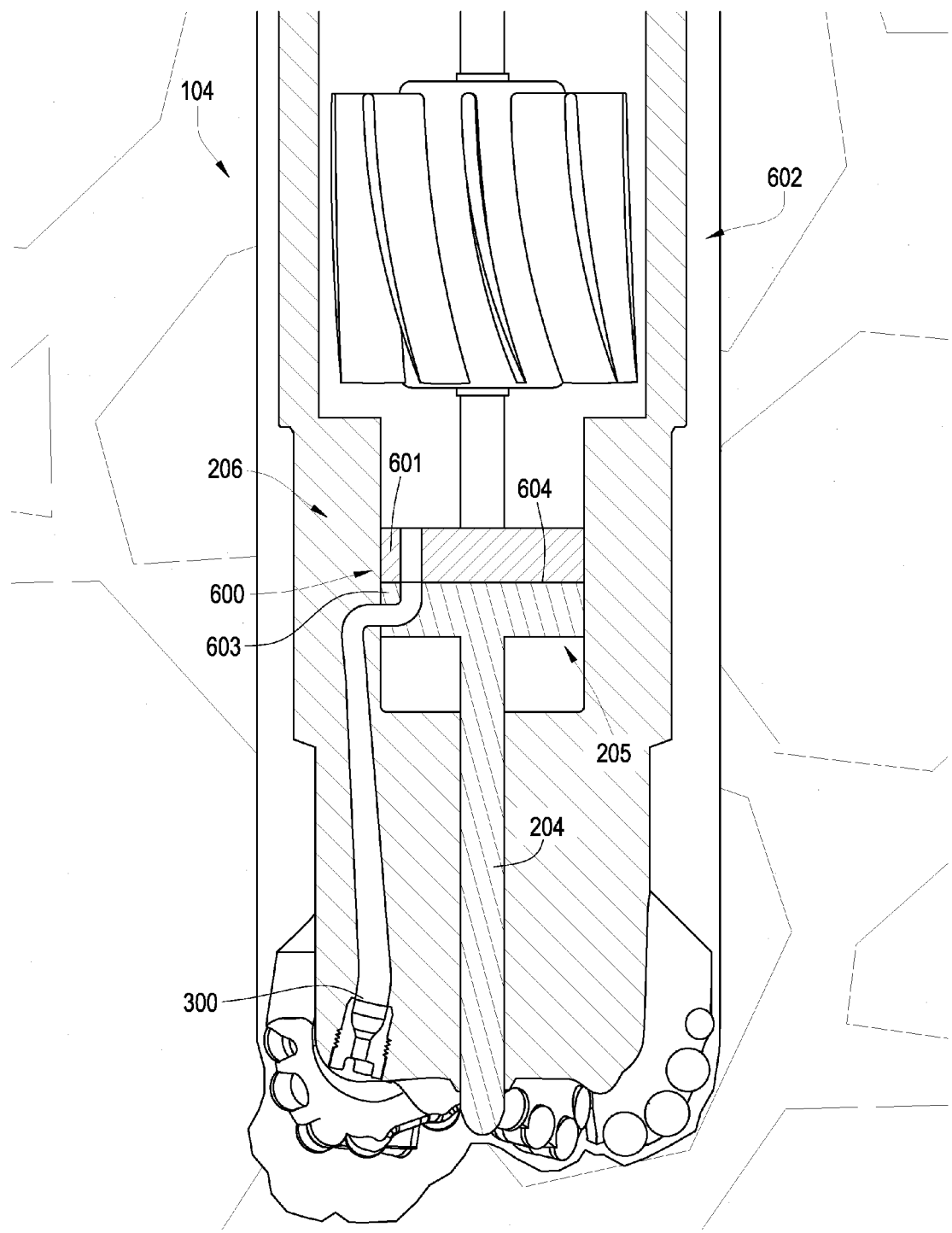
FIG. 6 is a cross-sectional diagram of another embodiment of a tool string bit.

In other embodiments, the relief mechanism 206 may be a rotary valve 600 as shown in FIG. 6. The rotary valve 600 may comprise a first disc 601 attached to a driving mechanism 602 and a second disc 603 axially aligned with and contacting the first disc 601 along a flat surface 604. Each disc 601, 603, may have at least one port, the ports being adapted b align periodically when the discs rotate relative to one another, allowing fluid to flow through the aligned ports. In this embodiment, the driving mechanism 602 may be a turbine. In other embodiments, the driving mechanism may be a motor or an electric generator. The speed of the driving mechanism 602 may be controlled by a closed loop system. The speed may be adjusted in order to achieve the optimal ROP in a downhole drilling operation. Varying downhole formations may require different rotational speeds in order to most efficiently break up the formation being drilled. For example, while drilling in a harder downhole formation, the rotational speed of the bit 104 may need to be slower than when drilling in a softer formation. The jack element 204 and the driving mechanism 602 may rotate opposite each other. The proximal end 205 of the jack element 204 may form a part of the second disc 603.

As the rotary valve 600 is actuated, fluid may pulse through at least one nozzle 300, creating a suction pressure pulse downhole.

Figure 8:
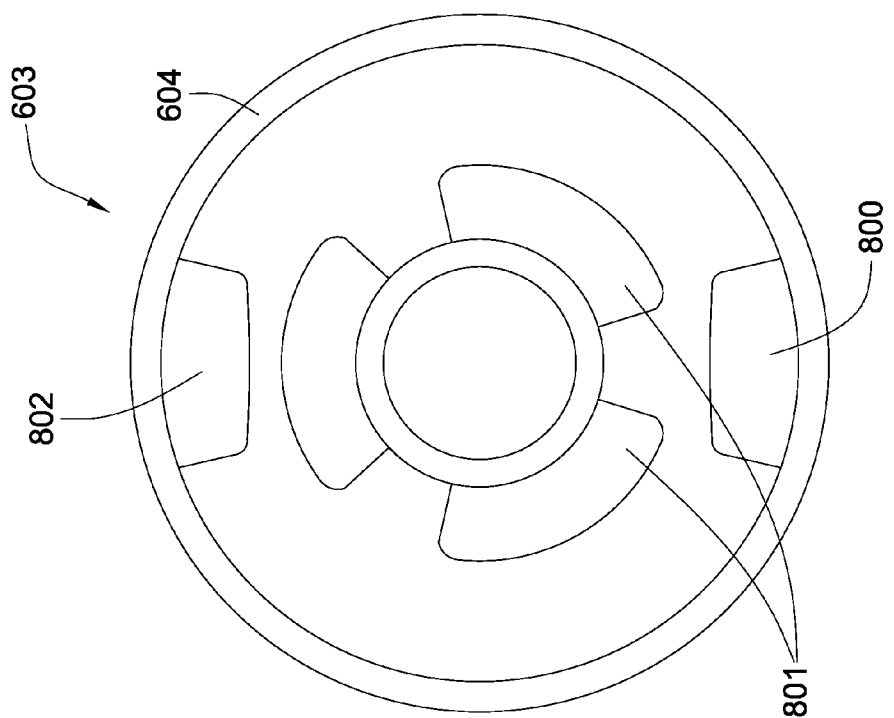
FIG. 8 is a sectional diagram of another embodiment of a valve in a tool string.
Figure 7:
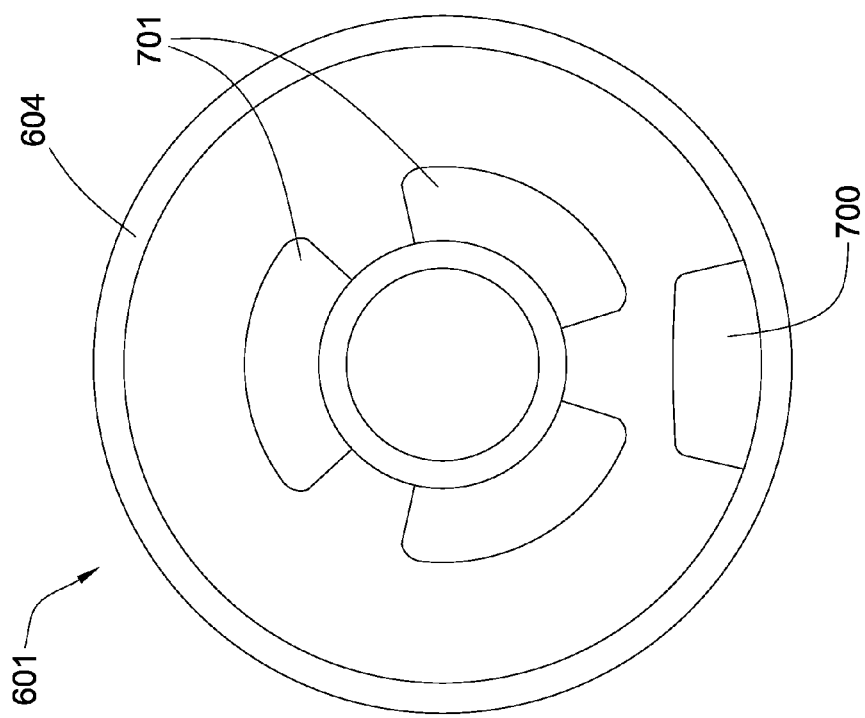
FIG. 7 is a sectional diagram of an embodiment of a valve in a tool string.

FIGS. 7 and 8 are sectional diagrams of the first disc 601 and the second disc 603 of the rotary valve. The discs 601, 603, may be axially aligned and may contact each other along a flat surface 604. The flat surface 604 may comprise a material selected from the group consisting of chromium, tungsten, tantalum, niobium, titanium, molybdenum, carbide, natural diamond, polycrystalline diamond, vapor deposited diamond, cubic boron nitride, TiN, AlNi, AlTiNi, TiAlN, CrN/CrC/(Mo, W)S2, TiN/TiCN, AlTiN/MoS2, TiAlN, ZrN, diamond impregnated carbide, diamond impregnated matrix, silicon bonded diamond, and/or combinations thereof The first disc 601 may have a fluid port 700 and the second disc may have a fluid port 800, wherein the discs 601, 603, rotate relative to one another, the fluid ports 700, 800, periodically align such that fluid may pass through the valve. The fluid passing through the valve may form a fluid pulse that may be used to create a suction pressure pulse at the bottom of a wellbore being drilled. A portion of the fluid in the fluid passageway of the bit may pass through the fluid ports 700, 800, whereas another portion of the drilling fluid may bypass the rotary valve.

The discs 601, 603, may also comprise fluid ports 701, 801, that continuously allow fluid to pass through the rotary valve. Fluid ports 701, 801, may direct the fluid to at least one nozzle disposed in the tool string bit. Another fluid port 802 may be disposed in the second disc 603, the fluid port 802 being adapted to direct fluid to at least one nozzle. As the two discs 601, 603, rotate opposite each other the fluid ports 800, 802, of the second disc 603 may align with the fluid port 700 disposed in the first disc 601 at different times so that the fluid may be periodically directed to at least one nozzle.

Figure 9:
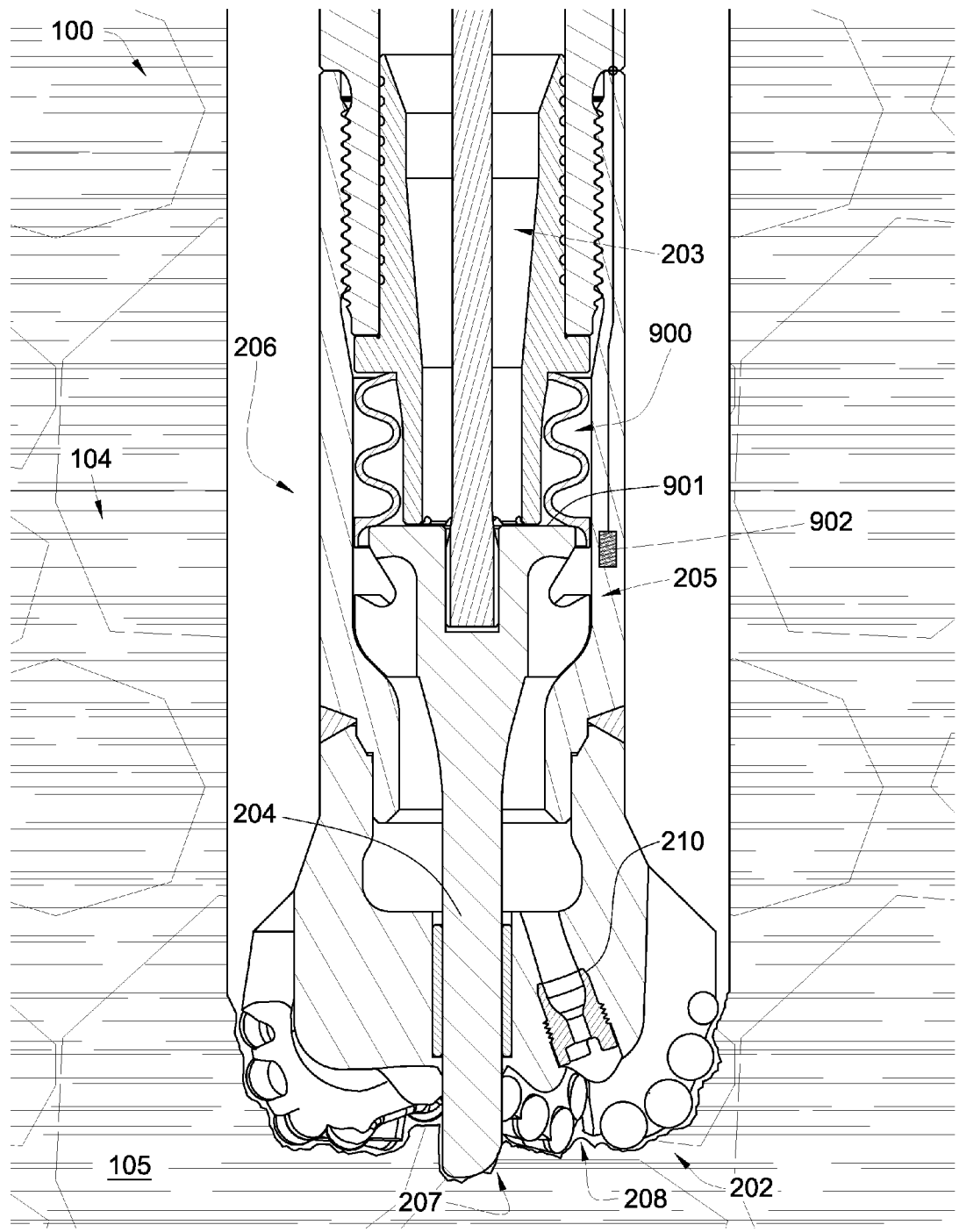
FIG. 9 is a cross-sectional diagram of another embodiment of a tool string bit.

Referring now to FIG. 9, the relief mechanism 206 may comprise a spring mechanism 900 positioned in the fluid passageway 203 and coaxial with the jack element 204; the spring mechanism 900 may be adapted to engage the jack element 204. The spring mechanism 900 may comprise a coil spring, Belleville spring, a compression spring, a tension spring, or a gas spring. The proximal end 205 of the jack element 204 may be part of the relief mechanism 206 such that vibrations of the jack element 204 opens and closes the valve. The proximal end 205 of the jack element 204 may restrict fluid from flowing through the fluid passageway 203 into the nozzle 210. This restriction of fluid flow may cause a pressure to build up at the restriction and eventually displace the jack element into the formation such that the fluid pressure is relieved by allowing fluid to flow around the proximal end 205 of the jack element 204. Fluid may exit the tool string bit 104 through at least one nozzle 210. Drilling fluid may be useful in cooling the working face 202 of the tool string 100 as well as in helping to break up a downhole formation 105. The distal end 207 of the jack element may contact the formation 105 during a drilling operation. The formation 105 may overcome the force of the drilling fluid in the fluid passageway 203 and displace the jack element 204 to its original position and reforming the restriction. This continuous displacement of the jack element 204 may cause the fluid to pulse through the nozzle 210. When the proximal end 205 of the jack element 204 restricts fluid from passing through the nozzle 210 the pressure decreases in the bottom 208 of the wellbore 203, causing a suction effect. The suction effect may help in breaking up the formation 105 being drilled. When closed, the relief mechanism may restrict either a portion of the fluid flow within the passageway or all the flow within the fluid passageway.

At least a portion of the surface 901 of the relief mechanism 206 may have a hardness of at least 58 HRc. The surface 901 may comprise a material selected from the group consisting of chromium, tungsten, tantalum, niobium, titanium, molybdenum, carbide, natural diamond, polycrystalline diamond, vapor deposited diamond, cubic boron nitride, TiN, AlNi, AlTi, TiAlN, CrN/CrC/(Mo, W)S2, TiN/TiCN, AlTiN/MoS2, TlAlN, ZrN, diamond impregnated carbide, diamond impregnated matrix, silicon bonded diamond, and/or combinations thereof.

The tool string 100 may have a sensor 902 adapted to receive acoustic reflections produced by the pulse that propagates into the formation 105. The acoustic reflections may also be produced by the vibrations of the jack element 204. The acoustic reflections may vary with changing formation characteristics. Acoustic reflections received by the sensor 902 may be analyzed by a computer to determine these particular formation characteristics. Control equipment in communication with the computer may adjust the fluid flow in order to adjust the frequency of the jack element vibrations so that the drilling efficiency is maximized. In some formations, it may be desired to increase the time between fluid pulses through the nozzle when the formation being drilled is easily broken up using the suction pulse pressure effect.

Figure 10:
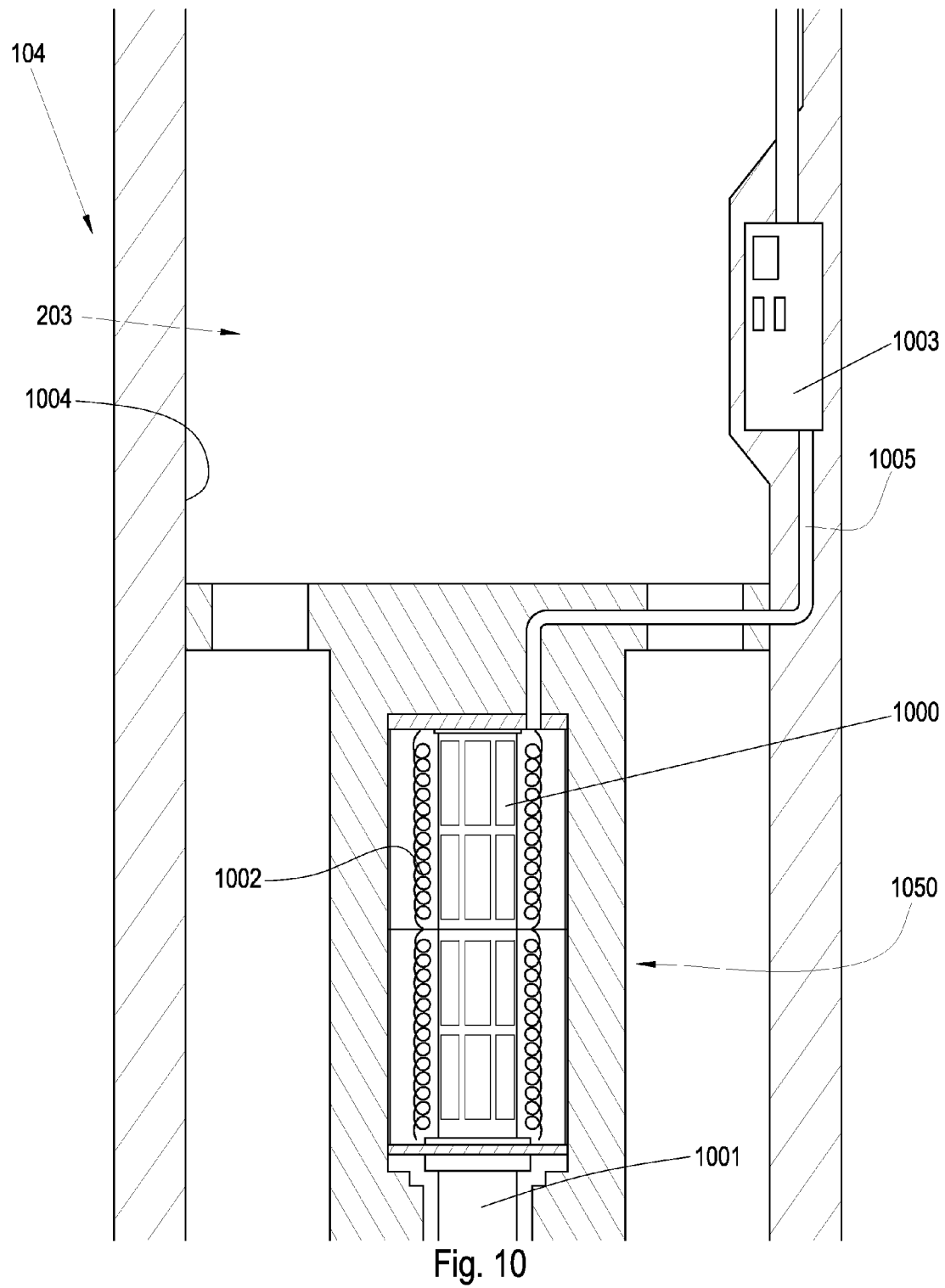
FIG. 10 is a cross-sectional diagram of an embodiment of a driving mechanism.

FIG. 10 is a diagram of an embodiment of a driving mechanism, more specifically, a driving mechanism in communication with a generator 1050. One such generator which may be used is the Astro 40 from AstroFlight, Inc. The generator 1050 may comprise separate magnetic elements 1000 disposed along the outside of the rotor 1001 which magnetically interact with the coil 1002 as it rotates, producing a current in the electrically conductive coil 1002. The magnetic elements 1000 are preferably made of samarium cobalt due to its high Curie temperature and high resistance to demagnetization.

The generator 1050 may be hydraulically driven by a turbine. The coil 1002 may be in communication with a load. When the load is applied, power may be drawn from the generator, causing the generator and thereby the turbine to slow its rotation, which thereby slows the discs of a rotary valve with respect to one another and thereby reduces the frequency the fluid may pulse through the valve and thereby through the nozzle. The load may be a resistor, nichrome wires, coiled wires, electronics, or combinations thereof. The load may be applied and disconnected at a rate at least as fast as the rotational speed of the driving mechanism. There may be any number of generators used in combination. In embodiments where the driving mechanism is a valve or a hydraulic motor, a valve may control the amount of fluid that reaches the driving mechanism, which may also control the speed at which the discs rotate.

The generator may be in communication with the load through electrical circuitry 1003. The electrical circuitry 1003 may be disposed within the wall 1004 of the fluid passageway 203 of the tool string bit 104. The generator may be connected to the electrical circuitry 1003 through a coaxial cable 1005. The circuitry may be part of a closed-loop system. The electrical circuitry 1003 may also comprise sensors for monitoring various aspects of the drilling, such as the rotational speed or orientation of the generator with respect to the bit 104. The data collected from these sensors may be used to adjust the rotational speed of the turbine in order to control the vibrations of the jack element, thereby controlling the rate of pulsing the fluid through the at least one nozzle.

Figure 11:
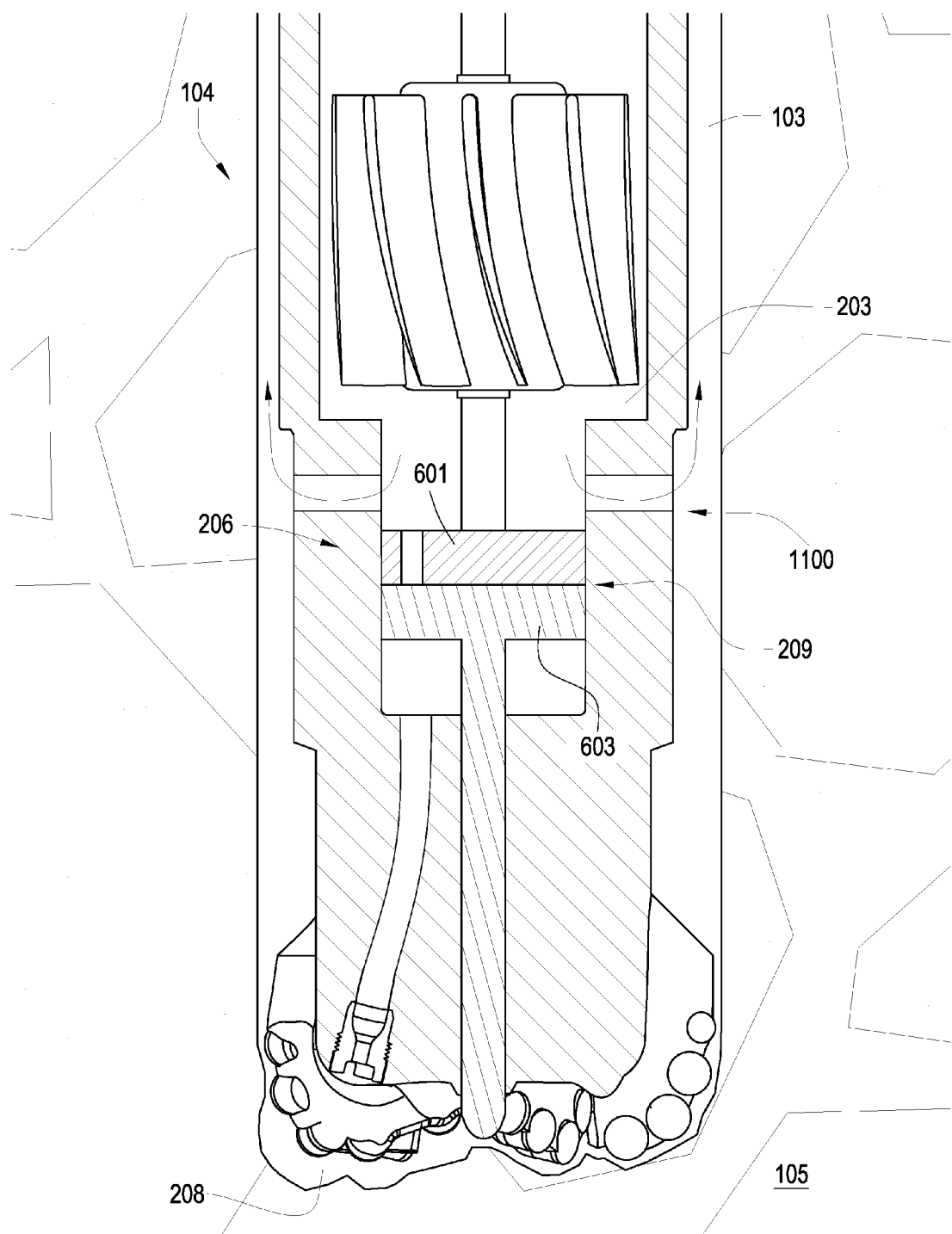
FIG. 11 is a cross-sectional diagram of another embodiment of a tool string bit.

Referring now to FIG. 11, another embodiment of a tool string bit 104 may comprise a relief mechanism 206 having a rotary valve 209 and at least one fluid port 1100 directing fluid to the wellbore 103 from the fluid passageway 203 and effectively bypassing the nozzles disposed within the working face of the tool string bit. As the first disc 601 and the second disc 603 of the rotary valve rotate relative to one another, fluid may intermittingly pass through aligned fluid ports disposed in the discs 601, 603. However, fluid restricted when the rotary valve is closed may exit the fluid passageway 203 through the at least one fluid port 1 100. This may be beneficial because pulsing fluid from the fluid passageway 203 directly to the wellbore 103 may help to stabilize the formation 105 higher up the wellbore 103 when drilling in an underbalanced environment at the bottom 208 of the wellbore 103.

FIG. 12 is a diagram of an embodiment of a method 1200 for forming a wellbore. The method 1200 includes providing 1201 a tool string bit with a body comprising a fluid passageway, at least a portion of a jack element being disposed within the body and comprising an end forming at least a portion of a relief mechanism in the fluid passageway. The method 1200 also includes deploying 1202 the bit when connected to a tool string into a wellbore and passing 1203 fluid through the fluid passageway. The method 1200 further includes destructing 1204 a bottom of the wellbore by pulsing the fluid traveling through the passageway by opening and closing the relief mechanism.

Whereas the present invention has been described in particular relation to the drawings attached hereto, it should be understood that other and further modifications apart from those shown or suggested herein, may be made within the scope and spirit of the present invention.

What is claimed is:

1. A method for forming a wellbore, comprising the steps of:
    providing a tool string bit with a body intermediate a shank and a working face, the bit body comprising a fluid passageway, at least a portion of a jack element being disposed within the body and comprising an end forming at least a portion of a relief mechanism in the fluid passageway and a distal end substantially protruding from the working face;
    deploying the bit when connected to a tool string into a wellbore;
    passing fluid through the fluid passageway; and
    destructing a bottom of the wellbore by pulsing the fluid traveling through the passageway by opening and closing the relief mechanism.

2. The method of claim 1, wherein the pulsing fluid generates a suction pressure pulse in the wellbore.

3. The method of claim 1, wherein an expansion or contraction of the tool string component connected to the drill bit contributes to the suction pressure pulse.

4. The method of claim 1, wherein the relief mechanism comprises a relief valve.

5. The method of claim 1, wherein the relief mechanism comprises a rotary valve.

6. The method of claim 1, wherein a portion of the relief mechanism is adapted for attachment to a driving mechanism.

7. The method of claim 6, wherein the driving mechanism is a motor, turbine, electric generator, or combinations thereof.

8. The method of claim 6, wherein the driving mechanism is controlled by a closed loop system.

9. The method of claim 6, wherein the driving mechanism and the jack element rotate opposite each other.

10. The method of claim 1, wherein the working face comprises a plurality of cutting elements.

11. The method of claim 1, wherein a spring mechanism disposed within the fluid passageway of the tool string bit is adapted to engage the jack element.

12. The method of claim 1, wherein a nozzle is disposed within an opening in the working face of the tool string bit.

13. The method of claim 1, wherein a surface of the relief mechanism comprises a hardness of at least 58 HRc.

14. The method of claim 13, wherein the surface comprises a material selected from the group consisting of chromium, tungsten, tantalum, niobium, titanium, molybdenum, carbide, natural diamond, polycrystalline diamond, vapor deposited diamond, cubic boron nitride, TiN, AlNi, AlTi, TiAlN, CrN/CrC/(Mo, W)S2, TiN/TiCN, AlTiN/MoS2, TiAlN, ZrN, diamond impregnated carbide, diamond impregnated matrix, silicon bonded diamond, and/or combinations thereof.

15. The method of claim 1, wherein the closed relief mechanism restricts all flow within the fluid passageway.

16. The method of claim 1, wherein the closed relief mechanism restricts a portion of the flow within the fluid passageway.

17. The method of claim 1, wherein the tool string comprises a sensor adapted to receive acoustic reflections.

18. The method of claim 17, wherein the acoustic reflections are produced by the pulse that propagates into the formation.

19. The method of claim 17, wherein the acoustic reflections are produced by the vibrations of the jack element.

20. The method of claim 1, wherein a pressure sensor is fixed to the side of the tool string bit.

* * * * *